INVENTOR.
ALBERT C. CHEW
BY
Kenyon & Kenyon
ATTORNEYS

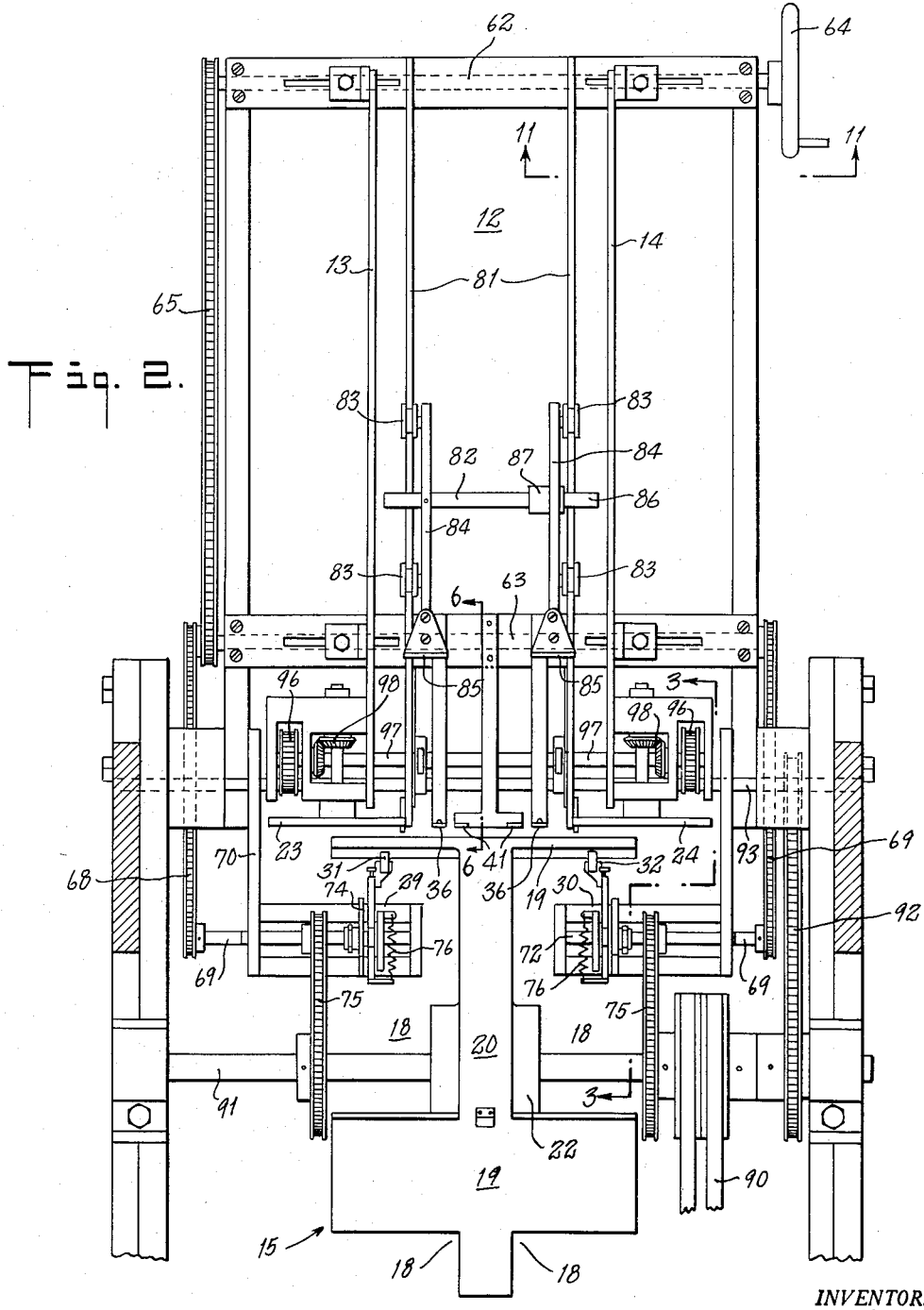

June 5, 1956 A. C. CHEW 2,749,117
MACHINE FOR HANDLING CARDS AND THE LIKE
Filed March 27, 1953 7 Sheets-Sheet 3
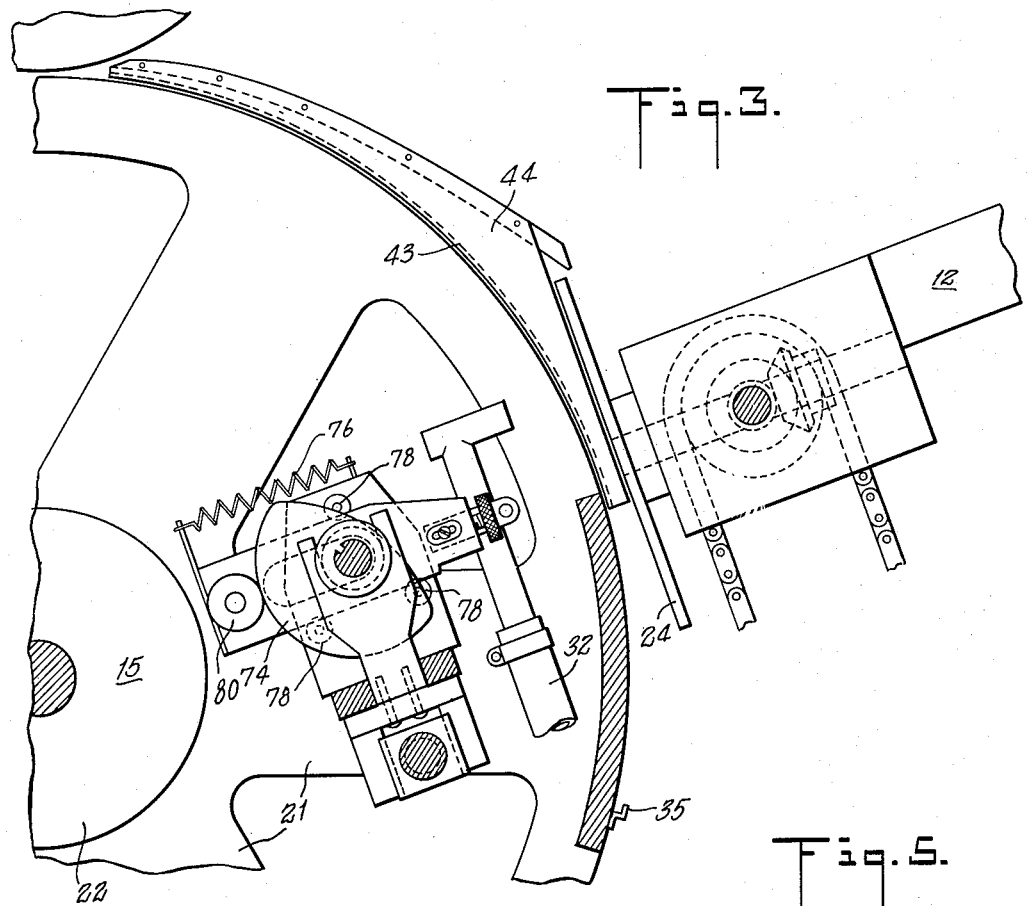
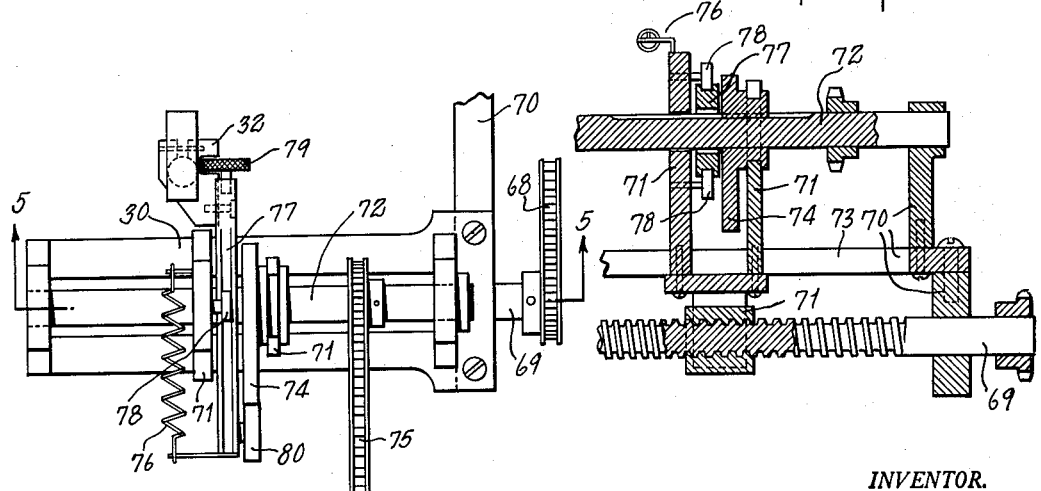
INVENTOR.
ALBERT C. CHEW
BY
Kenyon & Kenyon
ATTORNEYS

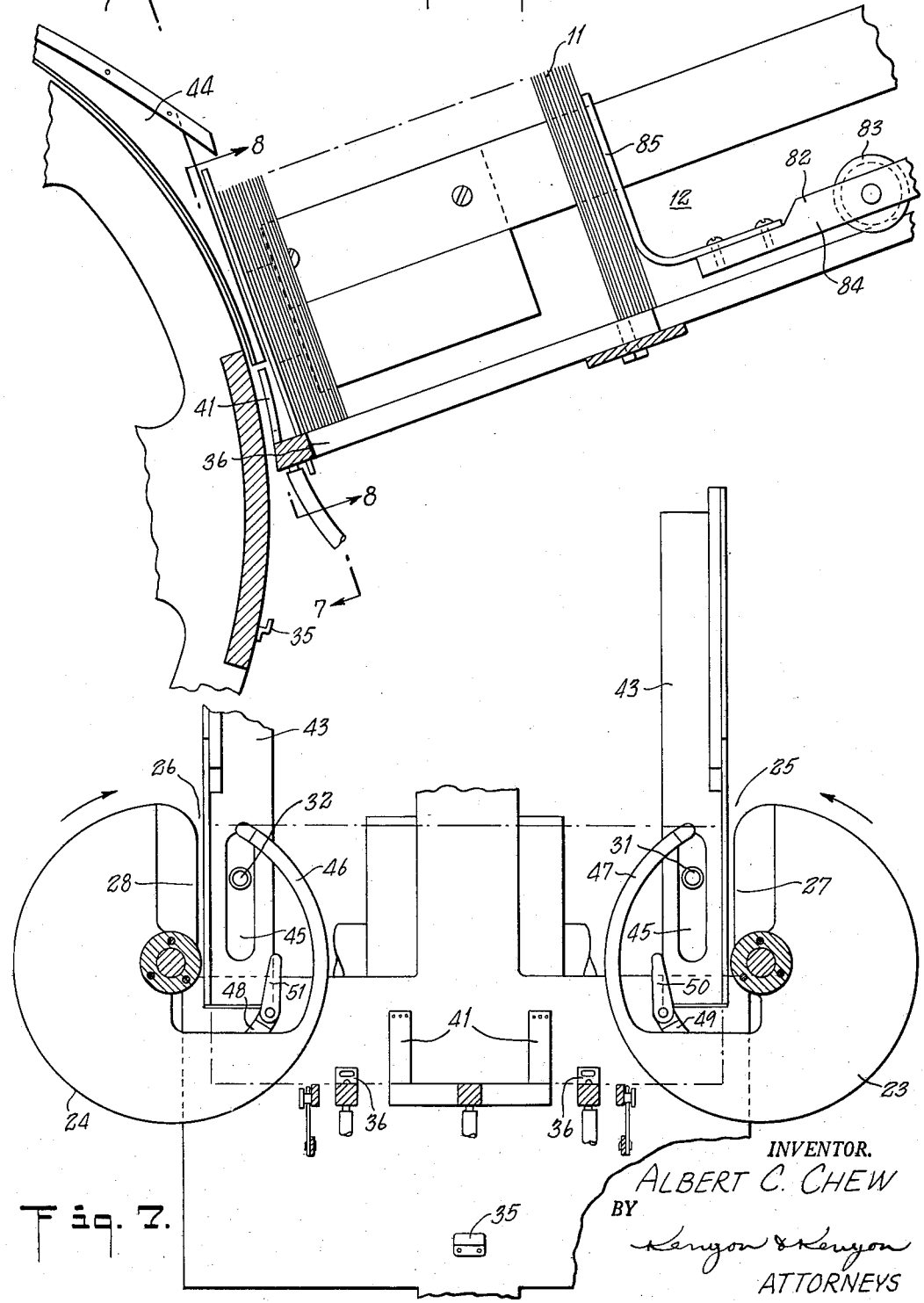

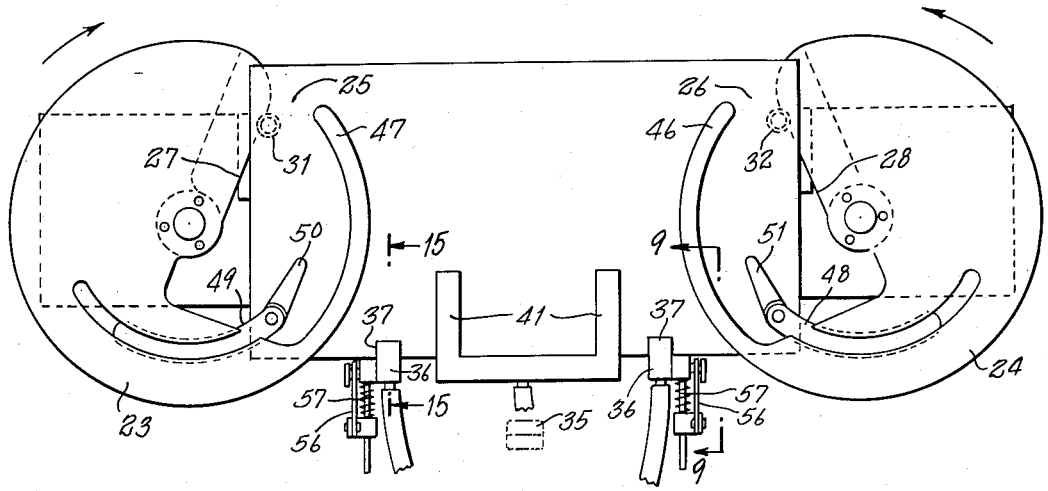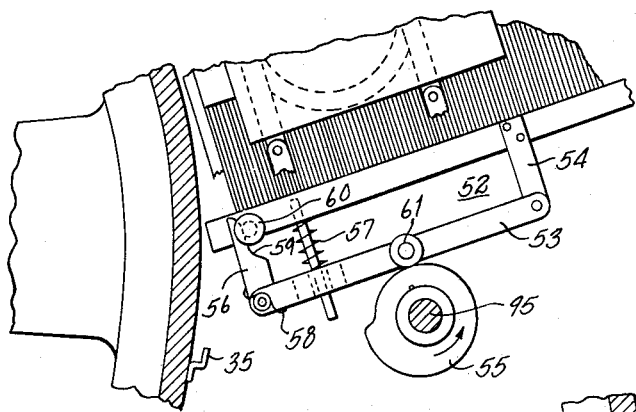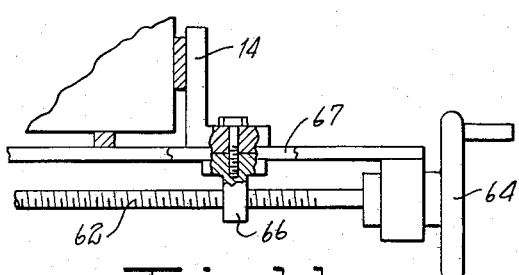

June 5, 1956     A. C. CHEW     2,749,117
MACHINE FOR HANDLING CARDS AND THE LIKE
Filed March 27, 1953     7 Sheets-Sheet 6
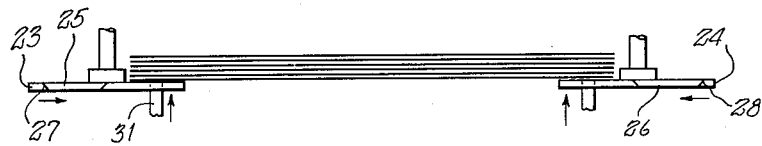
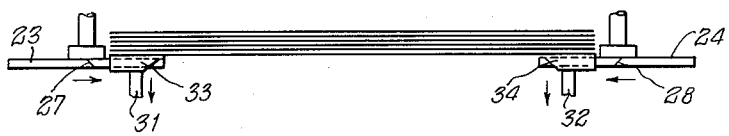
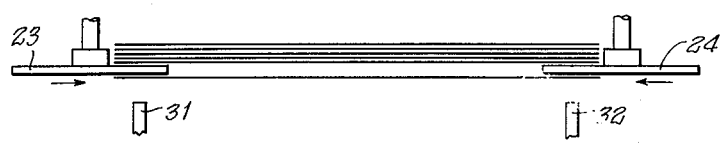
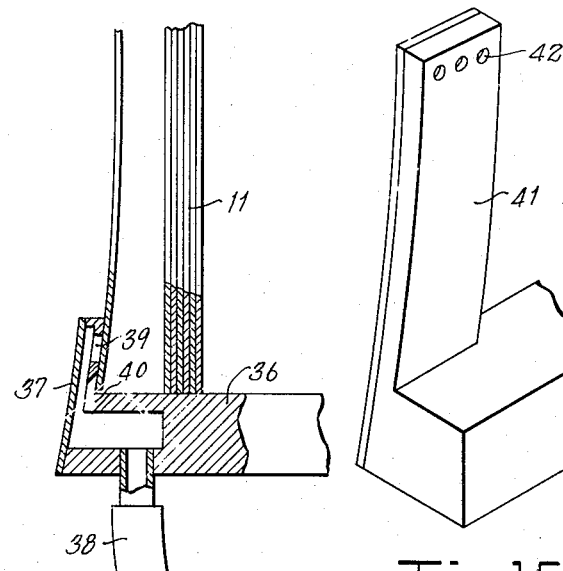
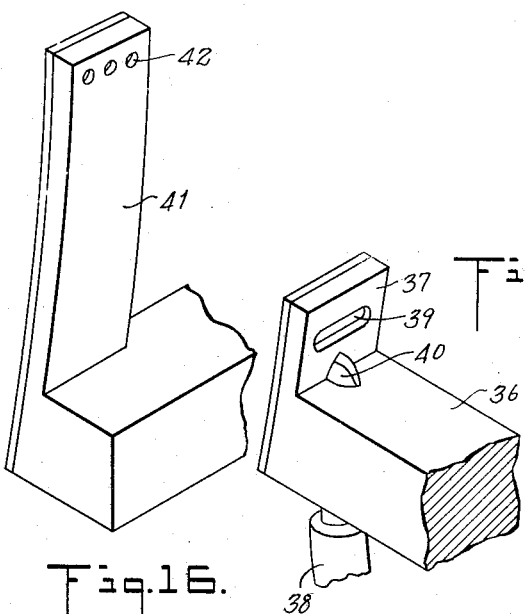
INVENTOR.
ALBERT C. CHEW
BY
Kenyon & Kenyon
ATTORNEYS June 5, 1956  A. C. CHEW  2,749,117
MACHINE FOR HANDLING CARDS AND THE LIKE
Filed March 27, 1953  7 Sheets-Sheet 7

INVENTOR.
ALBERT C. CHEW
BY
Kenyon & Kenyon
ATTORNEYS

United States Patent Office 2,749,117
Patented June 5, 1956

2,749,117

MACHINE FOR HANDLING CARDS AND THE LIKE

Albert C. Chew, New York, N. Y., assignor to Hobson-Miller Machinery, Inc., New York, N. Y., a corporation of New York Application March 27, 1953, Serial No. 345,199

17 Claims. (Cl. 271—11)

This application is a continuation-in-part of my application Ser. No. 282,630, filed April 16, 1952, now Pat. No. 2,687,300, dated August 24, 1954.

Particularly, but not exclusively, in the printing arts, there are manifold requirements for the economic and high speed handling of stacks of paper forms upon which is to be performed some operation such as the printing of written information. The preparation of common postal envelopes, cards or leaflets of various sizes, thicknesses and shapes are good examples.

In keeping with its general objects, the present invention provides for such usages as the foregoing, new and improved automatically functioning machines which have such prominent advantages as the following with respect to machines hitherto available: greater versatility in the accommodation of forms of different characteristics, i. e., different sizes, shapes, or thicknesses (stiffness), or number of pages of leaflet; and greater reliability against malfunctioning during high speed handling of the successive forms in the stack, whereby each form of the stack may be rapidly processed through the machine with minimum risk of mangling, improper printing, or improper ejection from the machine.

The combinations of elements comprising the invention and which provide the foregoing advantages, as well as others, will better be understood by reference to the following description of one illustrative embodiment. It is to be understood, of course, that numerous modifications of this embodiment may be made without departing from the full scope of the invention. It will be understood further that the illustrated machine is capable of handling many forms of small paper or like stacked objects, whether for printing or other purposes, and that, therefore, the word "card" is chosen for convenience of description and, consequently, is to be construed broadly as meaning any such objects.

In the annexed drawings which show the illustrated embodiment:

Fig. 2 is a top elevational view of Fig. 1 along the lines 2—2;

Fig. 3 is a detailed sectional view along the lines 3—3 of Fig. 2 and is an illustration in better detail, particularly of the reciprocating air suction mechanisms which draw the leading cards into engagement with the separator disks;

Fig. 4 is a top view of one of the air suction mechanisms shown in the preceding figures;

Fig. 5 is a cross-section along the line 5—5 of Fig. 4;

Fig. 6 is a section along the line 6—6 of Fig. 2;

Fig. 7 is a view along the line 7—7 of Fig. 6;

Fig. 8 is a view along the line 8—8 of Fig. 6 and, like Fig. 7, is an illustration of the separator disks for separating the leading cards from the stack immediately before their engagement with the roller, including parts of auxiliary suction and finger mechanisms which bring the lower or trailing edge of the cards into engagement with the roller;

Figs. 9 and 10 are detailed illustrations of the latter finger mechanism; Fig. 9 being a view along the line 9—9 of Fig. 8;

Fig. 11 illustrates the mechanism for varying the width of the feed hopper to accommodate different width cards;

Figs. 12, 13 and 14 are schematic illustrations of the working of the separator disks;

Fig. 15 is a view of the auxiliary air suction and air drag mechanisms along the line 15—15 of Fig. 8;

Fig. 16 is a view of the air drag mechanism;

Fig. 17 is a view of the auxiliary or card bottom air suction mechanism;

Figure 1:
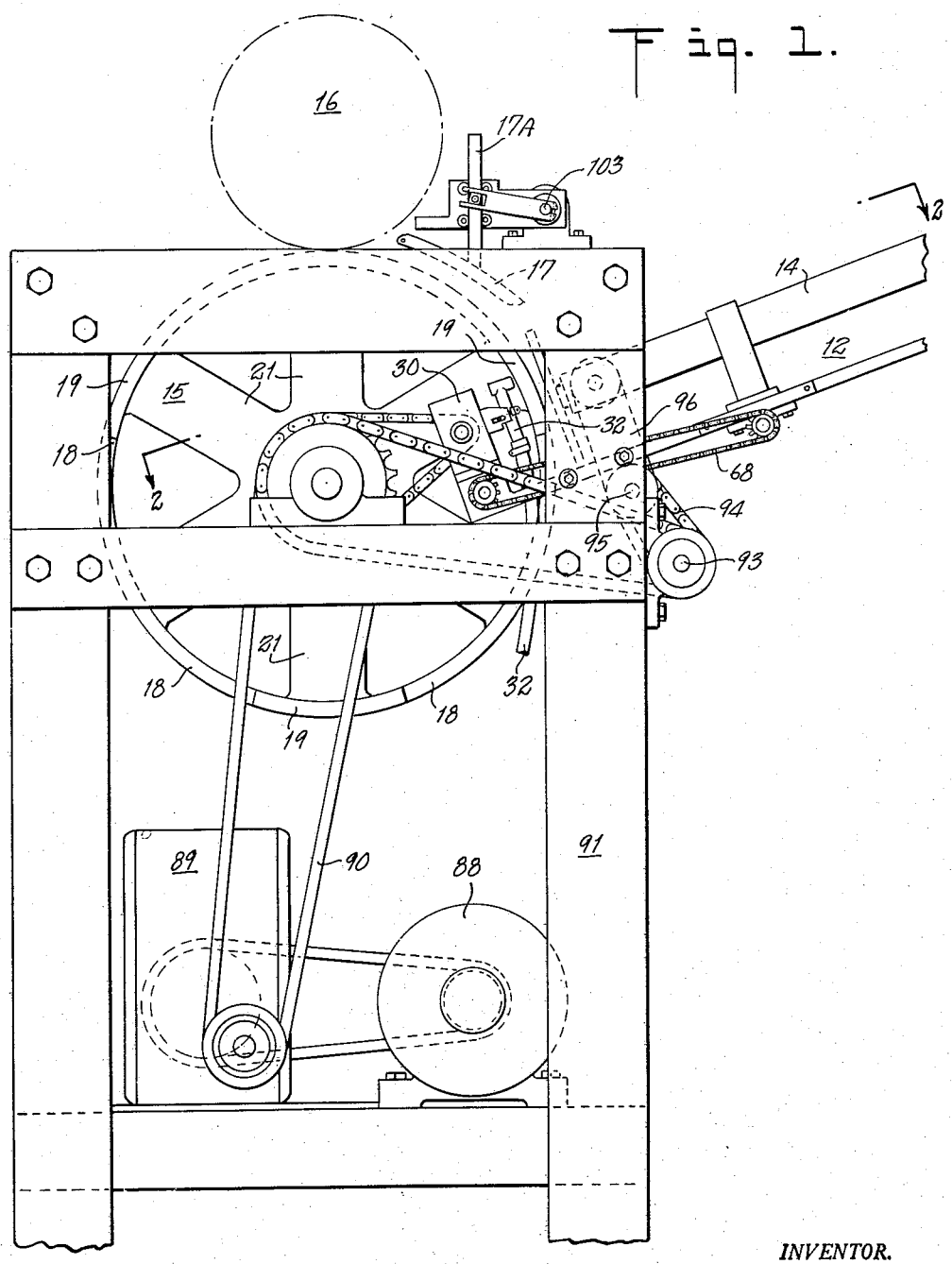
Fig. 1 is a side view of the entire machine showing, in general, a rack-like card feed hopper at the top right for feeding cards successively to the printing roller mechanism shown to its left, the power mechanisms being below.

Referring now to the drawings, the general elements of the machine are as follows. For printing purposes, a stack of cards 11 (Fig. 6) is to be placed on an inclined rack-like feed hopper 12 having side guide racks 13 and 14 laterally adjustable from the center line (Fig. 2) so as to accommodate different width cards. As the cards slide down the rack, the leading card is fed successively to the printing mechanism comprising the pressure roller 15 and the co-operating printing cylinder 16 so that the cards may be passed successively between the roller 15 and the cylinder 16 with the relative rotation of these two members. Vertically reciprocable forming shoe 17 is provided for engaging and guiding the upper edge of the cards and facilitating their entry into the space between cylinder 16 and the roller 15. The pressure roller 15, as best indicated by Fig. 2, takes the form of a cylinder having cut-out portions 18 extending axially inwardly from the ends of its generally cylindrical configuration so as to form peripherally spaced plate-like segments 19 upon which the cards are carried individually during the printing or like processing; the roller structure being supported and made rigid by its narrow central cylindrical strip 20 (Fig. 2), the spokes 21 and the hub 22.

For peeling off or separating the successive leading cards from the stack 11 so that they may be brought into engagement with the roller 15 by mechanisms presently to be indicated, there are provided the segmented separator disks 23 and 24 positioned so that each may engage one of the two ends of the leading card as best illustrated by the Figs. 7, 8 and 12 through 14. As seen, these disks have a wheel-like form except for the open gaps 25 and 26 in their peripheries leading into the open areas within the disks. In operation, these disks rotate in directions indicated by the arrows in Figs. 7, 8 and 12 through 14 in such manner that their leading edges 27 and 28 may be introduced between the leading card of the stack and its successor, whereby continued rotation will completely separate the leading card from the stack as one revolution of the disks is completed.

Cooperating with and facilitating the action of the disks 23 and 24 are the air suction mechanisms 29 and 30, i. e., one for each of the disks. These may comprise suitable, flexible suction hose devices 31 and 32 arranged to be reciprocated in timed relation by means later to be described in such manner that they will move forward toward the stack 11 and through the cut-out portions 18 into close proximity with the disks 23 and 24 and then move rearwardly at the proper time so as not to interfere with the movement of the segments 19. These mechanisms function to suck the upper corners of the card forwardly to insure unfailing insertion of the leading edges 27 and 28 between the leading card and its successor. The devices 31 and 32 may be supplied with low pressure air for suction by any suitable means (not shown). This action is best illustrated by the Figs. 12, 13 and 14. Fig. 12 illustrates the time at which the devices 31 and 32 have advanced to their forwardmost position at which they suck forward the upper corners of the card (Fig. 8) while the leading edges 27 and 28, beveled, as indicated, in the radial direction for sharpness are advanced in the direction indicated by the arrows for insertion between the sucked-forward corners of the leading card and its successor. Fig. 13 illustrates the moment at which suction has drawn forward the upper corners 33 and 34 and the leading edges 27 and 28 are just about to be inserted. Immediately after insertion, the devices 31 and 32 begin their return movement and the disks complete the separation as Fig. 10 indicates. As Fig. 14 further indicates, at this moment, a gap is provided between the devices 31 and 32 at the stack 11 for the arrival of the segment 19 which is to pick up the separated leading card.

On the trailing edges of the segments 19 which rotate counterclockwise, as seen in Figs. 1, 3, 6 and 9, are provided the shelf-like projections 35 (see also Figs. 7 and 8) for engaging the lower end of the leading card as it is separated from the stack and lifting the same along with the motion of the roller 15. In order to insure unfailing engagement of the lower edge of the leading card with these projections 35, there may be provided any of the following mechanisms which operate in conjunction with each other, to insure that each card of the stack is individually and accurately positioned upon projection 35 as the projection rises in rotation and which minimize the possibility of faulty operation such as mangling of cards, passage of several at once, or inaccurate position with respect to the type used in printing. Some of these mechanisms may be omitted, depending upon the character of the paper being handled; for example, some may be required for relatively stiff cards, but not for thin, delicate cards. In brief, these mechanisms are the main suction mechanisms, the suction members for the bottom of the cards, the suction drag members for the cards, the stripper mechanisms and the special constructions of the disks 23 and 24, all of which will be described in the following.

The suction members for the bottom cards in the hopper 12 are designated 36 and are readily seen in Figures 2, 6, 7, 15 and 17. They are affixed to the fixed framework of the hopper 12 and form a stop against which the lower cards of the stack 11 rest. One is adjustably positioned on each side of the center line of the stack 11. As better seen in Figures 15 and 17, they are constructed in the form of an L-shaped member having the short, upright arm 37 which together with a short, adjoining section of the longer horizontal arm is hollow, so that pressure within may be lowered by suitable suction means, illustrated by the hose 38. It will be seen that the upright arm 37 has a small opening 39 connecting the hollow interior with the atmosphere. There is a second similar opening 40 connecting the interior with the atmosphere, and this opening 40 is so cut as to extend a short distance along both the upright arm 37 and the longer, generally horizontal, arm.

The purpose of the opening 39 is to provide suction for attracting the bottom of the leading card of the stack 11 against the upright arm 37. The purpose of the extension of opening 40 along both arms is to provide a certain amount of suction or pressure immediately behind the bottom edge of the leading card, i. e., extra and positive air-flow in the region between the leading card and its successor, which flow will press against that side of the leading card which is remote from arm 37. This feature is of particular importance when the cards take the form of small leaflets of thin paper, for example, a leaflet of several pages hinged at the top and having outer ends of the pages resting on the bottom of the rack. In that case, the pressure created behind the leading leaflet, as just described, will insure that the leaflets or pages remain compacted against each other; no page edges trail and thus run the risk of being mangled. The amount of extension of the opening 40 along the longer arm of the member 36 will be selected to accommodate the thickness of an average-sized leaflet and should be slightly longer than that thickness. Fig. 15 illustrates one leading card sucked against the upright arm 37, and it will be seen how the extension of the opening 40 along the longer arm permits the suction to operate behind the lower edge of the card for the purposes described.

It has been found that, under conditions of high-speed operation of machines of this type, the sudden impact of the projection 35 with the bottom edge of the leading card may cause the card to bounce away from the projection. The projection, of course, tends to follow and re-engage the card as the rotation proceeds. However, it frequently happens that the projection misses the card in following up and thus does not re-engage. For example, there might be a momentary bending of the center of the card back toward the stack 11, enough to permit the pursuing projection 35 to move freely in front of the card without engaging it all. The net result, of course, would be a mangled card or the passage of two cards at once, or some similar malfunctioning.

To prevent this, the bouncing motion of the card is avoided by the suction drag created by the members 41, each positioned similarly to and adjacent to the members 36 previously described. Their construction (Fig. 16) is quite similar to the members 36, although the intended function is different. It will be noticed from Fig. 16 that the upright arms of the members 41 are somewhat longer than those of members 36, several inches for example. At the top, they are provided with small openings 42 communicating with the hollow interior and with the atmosphere. When suction is applied to the interior of this device similarly to that in the case of members 36, the leading card is sucked against the member 41 for considerable time during its travel and with sufficient force to prevent the momentary bounce upon impact with projection 35 previously referred to. With this arrangement, the leading card will remain in engagement with the projection 35 from the first instant of impact and, thus, it cannot be disengaged by bending, or otherwise, because the upright arm on the projection 35 will prevent that.

The main suction mechanisms 29 and 30, referred to earlier, operate in a special manner with stripper plates 43 (Fig. 7 and in dotted lines in Fig. 3) to insure that only a single leading card will be picked up by the pressure roller 15 and that there is no risk of the leading card being drawn so far forward as to be mangled by the leading edge of the segments 19. For this purpose, the stripper plates 43 take the form of arcuate metal strips fixedly positioned on the hopper 12 as by being attached to the bracket 44 (Fig. 3). The strips are concentric with and quite close to the roller 15—close enough to permit a projection 35 to grasp the lower edge of the leading card and cause it to slide up that side of strippers 43 which is farthest from the roller, i. e., the side between strippers 43 and the stack 11. At the lower ends of the strippers 43 are longitudinal openings 45 (Fig. 7) through which the main suction devices 31 and 32 operate upon the cards. The strippers 43, therefore, prevent any possibility that the main suction devices 31 and 32 might, in their retractive movement, draw the sides of the cards far enough to be in the path of the rising segments 19 of the roller 15. The sides of the card are stopped when they contact strippers 43.

In operation, the main suction devices 31 and 32 are adjusted so that at the extreme position of their movement toward the stack 11, they stop just short of the leading card (e. g.: 1/16″ to several-thousandths of an inch, depending on paper thickness). The purpose of this is to prevent several leading cards from being drawn toward the disks 23 and 24 at once. If the suction devices 31 and 32 were to make actual contact with the leading card before it had begun to leave the stack, they would tend to draw several cards—instead of only one. However, if they stop short of the leading card by the distance indicated, the leading card jumps or moves toward the suction device, rather than the suction device toward the card. The result of this action is to insure that the air-pressure involved draws only one card to the suction device. With this arrangement, it has been found possible to eliminate the use of the rifflers of conventional practice (air-jets directed into stack 11 from the sides to separate cards).

For high-speed operation, the disks 23 and 24 are given the following special constructions, in order to permit their being adjusted, to accommodate different thicknesses of paper, i. e., papers which bend easily and those which bend less readily. As previously indicated in discussing Fig. 13, for example, only the upper corners of the cards are drawn forward by the suction devices 31 and 32. If the paper bends easily, too big a portion of the corner area may be drawn forward by the suction devices 31 and 32. If the paper is relatively rigid, too little may be drawn forward. At the same time, the central portions of the card should not be drawn forward at all and the envelope should remain upright with respect to the bottom of the hopper. To insure that the central portions of the card will remain unaffected by the suction devices 31 and 32 and to keep the stack 11 upright and straight, the peripheral outline of the disks is interrupted as little as possible. That is brought about by the long tongues 46 and 47, which minimize the gaps 26 and 25.

As the Fig. 7 will indicate, therefore, the extent of corner portion of the card which may be drawn into gaps 25 and 26 is limited, and the area of the card between the tongues 46 and 47 is supported by these tongues in such a way as to render it immune to the effects of suction from the devices 31 and 32. Substantially, only that portion of the end of the card which is opposite the large central openings in the disks 23 and 24 can be subjected to suction. However, even this area subject to suction may require limitation, depending upon the stiffness of the paper. If it is thin paper which bends easily, the area should be limited to the upper corner fairly closely so that there not be too much bending of the card. If it is thick paper which bends less readily, it will be necessary to facilitate bending to the desired extent by permitting more of the area below the corner and within the area corresponding to the interior openings in disks 23 and 24 to be subject to the suction of devices 31 and 32. Adjustability, accordingly, is provided by the arms 48 and 49 which slide in arcuate grooves in their respective disks in such a manner that they may be extended farther toward the gaps 25 and 26, as desired, to limit the effective area of the large openings in the disks away from the peripheral gaps. They will, of course, be fixed by suitable means to the disks for any one setting corresponding to any one card stiffness or thickness. Thus, for stiff cards they would remain retracted substantially, as shown in Figs. 7 and 8. In the case of thinner cards, they would be rotated and extended close to the gaps 25 and 26.

Additional variation of effect area of the disk openings is provided by the arms 50 and 51 which can be rotated about the ends of arms 48 and 49 and fixed at any given angular relationship thereto. Thus, it will be seen that the arrangements of these internal arms 48 through 51 permit the operator to control the amount of card bending by providing a support for as much of the area below the card-corners as he desires, depending upon the stiffness of the card and consequent tendency to bend with air-pressure from the suction device.

As an auxiliary to or alternative for the suction mechanisms when stiff or thick cards are being processed, a finger mechanism 52, best illustrated in the Figs. 9 and 10, is positioned just below the inner edges of the racks 13 and 14. This finger mechanism operates in timed relation to the separator disks 23 and 24, roller 15 and suction mechanisms 29 and 30 to press the lower edge of the leading card toward the segment 19 just prior to its engagement by a projection 35. The mechanism may be affixed to the bottom of the hopper 12 and comprises the cam-operated arm 53 journalled on the member 54 affixed to the hopper 12, the cam 55 rotatable in the direction shown, and the finger 56. The arm 53 is biased downwardly by the spring 57 while the finger 56 is biased to rotate in a clockwise direction by a suitable hair spring 58 at its journal with the arm 53. As seen, the finger 56 has a cam surface 59 for engagement with a cam stop 60 so that upward motion of the finger 56 caused by upward motion of the arm 53 will in turn cause the finger 56 to be rotated counter-clockwise toward engagement with the lower edge of the leading card as illustrated in Fig. 10. Downward or counter-clockwise rotation of the arm 53 will permit withdrawal of the finger 56 to the position shown in Fig. 9 by virtue of the spring biasing. It will be apparent how the cam 55 operating on the cam roller 61 of the arm 53 will bring about this action when the cam is adjusted to provide the proper timing with relation to the separator disks and the segments 19. It is understood, of course, that the finger mechanisms are in duplicate—one co-operating with each separator disk, as Fig. 8 illustrates.

As will be apparent from the Fig. 2, for example, the separator disks 23 and 24, the strippers 43, bottom suction devices 36, together with the just-described finger mechanisms and their necessary operating mechanisms, are mounted on the guide racks 13 and 14 so that they may move therewith when adjustment is made for cards of different lengths. Drag devices 41 may also be so mounted although they are shown fixed to the stationary parts of hopper 12. In order that the guide racks 13 and 14 may be adjusted toward and away from the center line for purposes of adjusting the machine to accommodate any given length of card, there may be provided the worm-screw mechanisms 62 and 63 driven by the manually operable wheel 64 and the interconnecting belt 65. As will be readily understood, these mechanisms can be arranged to engage the guide racks 13 and 14 and move them in unison and in opposite directions toward and away from the center line of the hopper, carrying separator disks, strippers, suction devices, etc., with them. Fig. 11 details a suitable construction in which the worm-screw mechanism 62 engages the slide member 66 to move the same laterally of the hopper; the slide member 66 in turn engaging the guide rack 14 through a suitable slot 67 in the supporting structure.

Similar lateral adjustment of the air-suction mechanisms 29 and 30 to keep the suction hose devices 31 and 32 aligned with separator disks 23 and 24 and strippers 43 may be accomplished by operation of wheel 64 through the chain or belt drives 65 and 68. It will be noted that drive 68 is powered from the worm-screw mechanism 63; in operation, it drives a worm-screw mechanism 69 which causes the suction mechanisms to move in and out from the center line in synchronization with the disks 23 and 24 and the strippers 43. The suction mechanisms are suitably and slidably mounted for the purpose on brackets 70 affixed to the main framework of the machine (Fig. 2).

Further details of the suction mechanisms 30 and 31 are shown in the Figs. 4 and 5 which depict the mechanism 30. It will be seen how the worm-screw mechanism 69 operating through a suitable carriage 71 may cause the entire suction mechanism to move laterally by sliding along a suitable supporting and drive-rod 72 and through a suitable slot-opening 73 in support 70.

Reciprocation of the suction mechanisms toward and away from the separator disks is accomplished by means of a cam-mechanism 74 powered by a chain or belt-drive 75 from the main shaft of the roller 15. The devices 31 and 32 are normally biased forward by the springs 76 toward the separator disks. Springs 76 operate on a slide 77 having a central slot riding over the shaft 72 and guided by rollers 78 affixed to the laterally adjustable carriage. Fine adjustment of the position of devices 31 and 32, with respect to the disks 23 and 24, may be accomplished by the knurl 79 which, by suitable screw mechanisms, advances or retracts the mechanisms 31 and 32. Eccentric cam 74 operates on the cam roller 80 affixed to slide 77. The cam is slidably mounted on the shaft 72 but may be made to rotate therewith with a suitable spline connection. It will be readily observed that rotation of the cam 74 by the shaft 72 will cause the devices 31 and 32 to move backwards against the tension of springs 76 which will return them toward the separator disks when cam pressure is relieved. At very high speed, it may be desirable to use the cam drive in both directions so that the action will be more positive. It is understood, of course, that low pressure for suction may be supplied to the suction devices 31 and 32 by any suitable means (not shown).

The bottom of the hopper 12 upon which the cards of stack 11 rest is formed by the rails 81. To aid in keeping the stack 11 closely packed, there is provided a truck 82 which rolls on the rails 81, and this is seen readily in Figs. 2 and 6. The wheels 83 ride on the rails 81 and are interconnected by the side members 84, i. e., each side member 84 has two wheels affixed to it. Each side member also has a "book-end" like device 85 which presses against the top of the stack under the weight of the truck (hopper 12 and rails 81 are inclined). To accommodate the lateral adjustments of the separator disks and other mechanisms previously described, the side members of the truck are slidably interconnected by a rod 86 which may, for example, be fixed to the right-hand side member of the truck, yet yieldably journalled in the bushing 87 affixed to the right-hand side member, as seen in Fig. 2.

Figure 18:
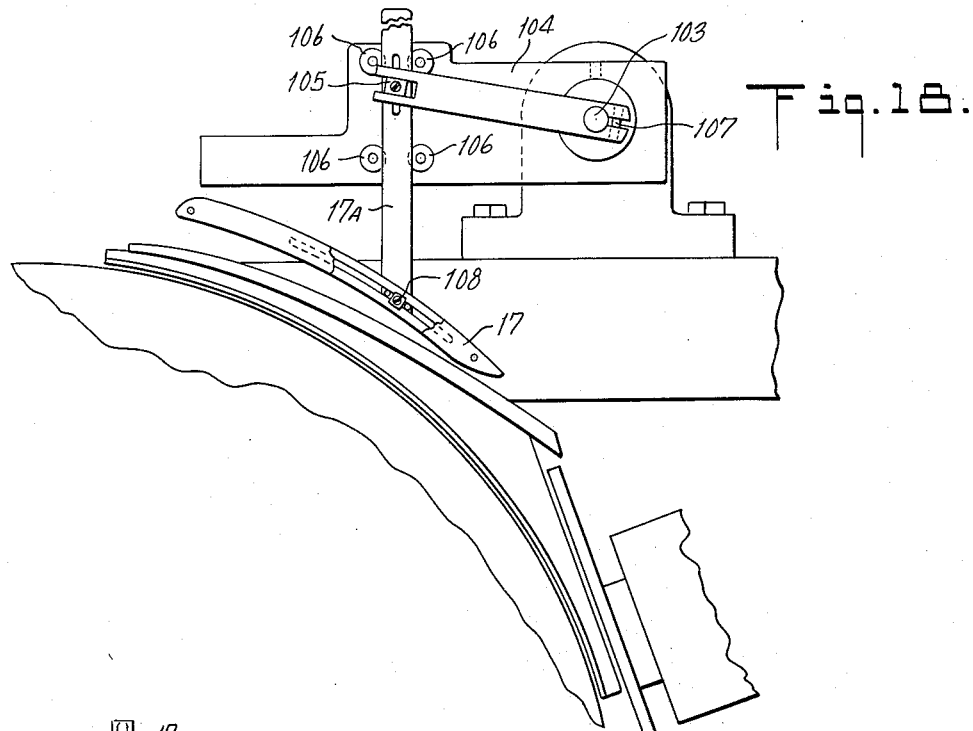
Figs. 18, 19 and 20 illustrate the mechanism for operating the forming shoe.
Figure 19:
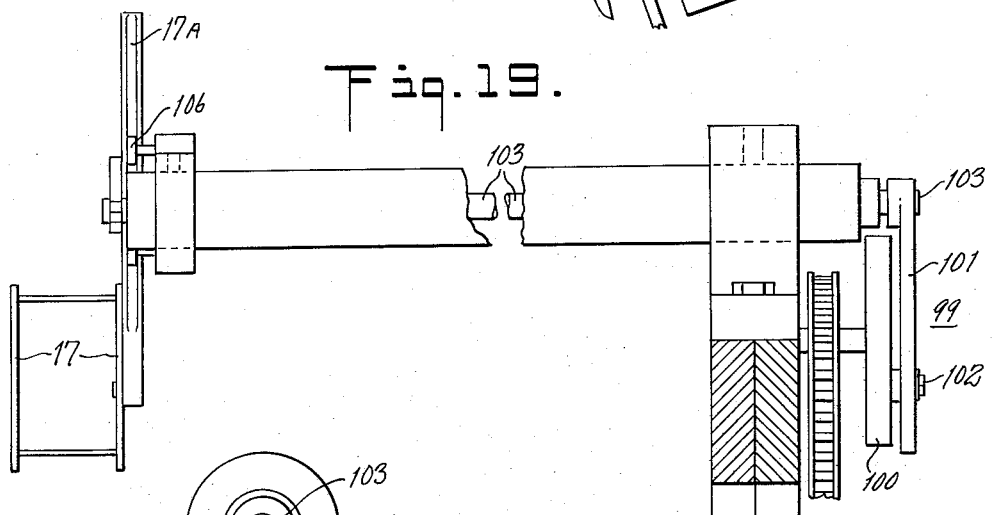
Figure 20:
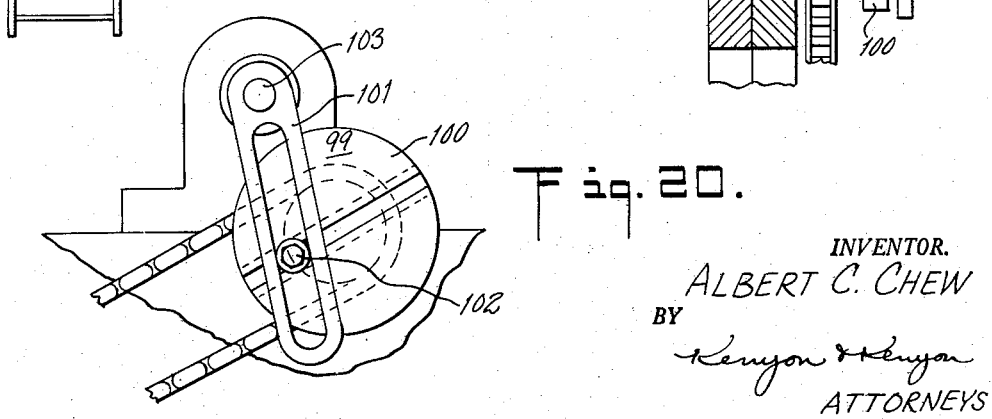

Referring to Figs. 18, 19 and 20, the forming shoe 17 is caused to reciprocate up and down with its support 17A by means of the following mechanisms. A bell crank mechanism 99 comprising the rotating wheel 100 and slotted arm 101, the slot of which receives pin 102 on wheel 100, reciprocates a shaft 103. The mechanism may derive power from any of the power shafts in the apparatus through the chain drive shown in Fig. 19. The amplitude of rotary reciprocation of the shaft 103 may be adjusted by adjusting the position of pin 102 diametrically of wheel 100, as will be readily understood. Affixed to the shaft 103 is the frame 104, the left forked end of which slidably engages pin 105 on support 17A, which is held in a vertical position by suitable roller guides 106. It will thus be apparent that as the shaft 103 reciprocates it will cause the forming shoe to do likewise. The upper and lower limits of reciprocation may be adjusted by adjusting the position of the frame 104 peripherally of the shaft 103, the lock-nut 107 being provided for the purpose. The necessary synchronization of the forming shoe movement with respect to the other elements of the machine may be obtained by adjusting the angular relationship of the wheel 100 to the shaft to which it is affixed. Forming shoe 17 may be adjusted forward or backward by nut 108.

It is to be understood that any suitable means may be provided for causing the timed co-operation of the foregoing elements in the manner indicated, i. e., such that while the roller 15 rotates continuously the separator disks will feed the leading card of the stack 11 to a segment 19 in time to permit engagement of the projection 35 with the lower edge, the reciprocation of the suction mechanisms at the proper time and the actuation of the fingers 56 at their proper time. However, a suitable means for powering the mechanisms in these timed relationships will now be indicated.

The prime mover of the machine may comprise the motor 88 (Fig. 1) driving the variable speed controlling gear box 89 which in turn drives through the belt 90 and the roller 15, all of these mechanisms being fixedly mounted on the table-like structure 91. As Fig. 2 illustrates, the belt 90 applies power to the shaft 91 of the roller 15. Power from this shaft may then be transmitted through a suitable belt or chain drive illustrated by 92 to a main drive shaft 93 (Fig. 1). From the shaft 93 a similar belt or chain drive 94 may apply power to the shaft 95 upon which the cams 55 (Figs. 9 and 10) are mounted, thus providing the power for the finger mechanisms. Angular positioning of the cams 55 on this shaft 95, as is well understood, will permit adjustment of the necessary timing relationships. Further suitable belts or chain drives 96 may transmit power to a shaft 97 (Fig. 2) which supplies the motive power for the separator disks 23 and 24 through the beveled gear systems 98 mounted, as already indicated, by suitable means on the guide racks 13 and 14. The various drives may be appropriately arranged to accommodate lateral adjustment of the racks 13 and 14.

I claim:

1. In a mechanism for transferring cards from a stack serially to the segments of a segmented rotating roller, a hopper for feeding a stack of cards serially to the roller, projections on the trailing edge of each segment for engaging the trailing edge of the leading card of the stack to carry that card in rotation with the roller, rotary separator discs for separating the leading card from those following, suction devices reciprocatable into the gaps between segments of the roller for pulling the corners of the leading card toward the roller for engagement by the separator discs, a drag suction device for damping the motion of the card as it is engaged by the projection to prevent its bouncing upon impact with the projection, and a means synchronizing the operation of the roller, discs, and reciprocatable suction devices, such that the reciprocatable suction devices advance through the gaps in the roller to draw card corners into the path of the separator discs and withdraw out of the path of the advancing segments, and the discs separate the leading card from the stack in time to be picked up by the advancing projections.

2. A mechanism as in claim 1 including another suction device adjacent the trailing edge of the leading card for drawing that edge toward the roller to insure its engagement by the projections.

3. A mechanism as in claim 2 in which the latter suction device includes means for creating pressure on the side of the trailing edge away from the roller.

4. A mechanism as in claim 1 including finger means adjacent the trailing edge of the leading card for pushing that edge toward the roller to insure its engagement by the projections.

5. A mechanism as in claim 1 including a forming shoe reciprocatable adjacent the roller for engaging the leading edge of each card and pushing it toward the roller.

6. In a mechanism for transferring cards from a stack serially to the segments of a segmented rotating roller, a hopper for feeding a stack of cards serially to the roller, projections on the trailing edge of each segment for engaging the trailing edge of the leading card of the stack to carry that card in rotation with the roller, rotary separator discs for separating the leading card from those following, suction devices reciprocatable into the gaps between segments of the roller for pulling the corner of the leading card toward the roller for engagement by the separator discs, stripper means for breaking the grip of the suction means on said corner and preventing the suction means from dragging the cards into the path of the roller segments, a drag suction device for damping the motion of the card as it is engaged by the projection to prevent its bouncing upon impact with the projection, and a means synchronizing the operation of the roller, discs, and reciprocatable suction devices, such that the reciprocatable suction devices advance through the gaps in the roller to draw card corners into the path of the separator discs and withdraw out of the path of the advancing segments, and the discs separate the leading card from the stack in time to be picked up by the advancing projections.

7. A mechanism as in claim 6 including another suction device adjacent the trailing edge of the leading card for drawing that edge toward the roller to insure its engagement by the projections.

8. A mechanism as in claim 7 in which the latter suction device includes means for creating pressure on the side of the trailing edge away from the roller.

9. A mechanism as in claim 6 including finger means adjacent the trailing edge of the leading card for pushing that edge toward the roller to insure its engagement by the projections.

10. A mechanism as in claim 6 including a forming shoe reciprocatable adjacent the roller for engaging the leading edge of each card and pushing it toward the roller.

11. In a mechanism for transferring cards from a stack serially to the segments of a segmented rotating roller, an inclined hopper for sliding a stack of cards down the hopper for serial feed to the roller, projections on the trailing edge of each segment for engaging the trailing edge of the leading card of the stack to carry that card in rotation with the roller, rotary separator discs with openings extending from their peripheries for separating the leading card from those following by engaging opposite leading corners of that card and passing that card progressively from one side to the other of the discs by their rotation, suction devices reciprocatable into the gaps between segments of the roller for pulling the leading corners of the leading card toward the roller for engagement by the separator discs, stripper guides concentric with the roller for breaking the grip of the suction means on said corners and preventing the suction means from dragging the cards into the path of the roller segments and guiding the card onto the roller, a drag suction device adjacent the roller for damping the motion of the card as it is engaged by the projection to prevent its bouncing upon impact with the projection, and a means synchronizing the operation of the roller, discs, and reciprocatable suction devices, such that the reciprocatable suction devices advance through the gaps in the roller to draw card corners into the path of the separator discs and withdraw out of the path of the advancing segments, and the discs separate the leading card from the stack in time to be picked up by the advancing projections.

12. A mechanism as in claim 11 including another suction device adjacent the trailing edge of the leading card for drawing that edge toward the roller to insure its engagement by the projections.

13. A mechanism as in claim 12 in which the latter suction device includes means for creating pressure on the side of the trailing edge away from the roller.

14. A mechanism as in claim 11 including finger means adjacent the trailing edge of the leading card for synchronously pushing that edge toward the roller to insure its engagement by the projections.

15. A mechanism as in claim 11 including a forming shoe reciprocatable adjacent the roller for synchronously engaging the leading edge of each card and pushing it toward the roller.

16. A rotary separator disc for separating the leading card from a stack of cards comprising an opening in the center of the disc and a gap in the periphery connecting therewith whereby the corner of a card may be drawn into the opening and gap and passed by rotation of the disc progressively from one side to the other thereof, an adjustable arm in the opening for adjusting the effective extent of the opening away from the gap thereby to adjust the area of card corner entering the opening.

17. A separator as in claim 16 including a rotary arm on the end of the first arm toward the gap, the rotary arm being angularly adjustable with respect to the first arm whereby further to adjust the effective area of the opening.

References Cited in the file of this patent

UNITED STATES PATENTS 1,460,314    Deck _____ June 28, 1923